United States Patent

Madan et al.

(10) Patent No.: US 7,558,917 B2
(45) Date of Patent: Jul. 7, 2009

(54) INVERSE QUERY ENGINE SYSTEMS WITH CACHE AND METHODS FOR CACHE MAINTENANCE

(75) Inventors: Umesh Madan, Bellevue, WA (US); Geary L. Eppley, Carnation, WA (US); David Wortendyke, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 412 days.

(21) Appl. No.: 10/779,328

(22) Filed: Feb. 13, 2004

(65) Prior Publication Data

US 2005/0182754 A1 Aug. 18, 2005

(51) Int. Cl.
G06F 12/00 (2006.01)
G06F 7/00 (2006.01)
G06F 17/30 (2006.01)
G06F 13/00 (2006.01)
G06F 13/28 (2006.01)

(52) U.S. Cl. ............... 711/118; 707/3; 707/4; 707/5

(58) Field of Classification Search ............ 707/3, 707/4, 5; 711/133, 136, 118
See application file for complete search history.

(56) References Cited

U.S. PATENT DOCUMENTS

| | | | | |
|---|---|---|---|---|
| 4,928,239 | A | * | 5/1990 | Baum et al. ............ 711/136 |
| 5,668,987 | A | * | 9/1997 | Schneider ............... 707/3 |
| 5,845,091 | A | | 12/1998 | Dunne et al. |
| 5,892,937 | A | * | 4/1999 | Caccavale ............... 711/135 |
| 6,105,027 | A | | 8/2000 | Schneider et al. |
| 6,253,195 | B1 | | 6/2001 | Hudis et al. |
| 6,359,886 | B1 | | 3/2002 | Ujihara et al. |
| 6,539,394 | B1 | | 3/2003 | Calvignac et al. |
| 6,631,374 | B1 | * | 10/2003 | Klein et al. ............... 707/8 |
| 6,781,961 | B1 | | 8/2004 | Gunsay |
| 6,934,699 | B1 | * | 8/2005 | Haas et al. ............... 707/2 |
| 7,035,846 | B2 | * | 4/2006 | Gupta et al. ............ 707/3 |
| 2003/0123387 | A1 | * | 7/2003 | Jackson .................. 370/230 |
| 2003/0123456 | A1 | | 7/2003 | Denz et al. |
| 2003/0165160 | A1 | * | 9/2003 | Minami et al. ........... 370/466 |
| 2003/0204664 | A1 | * | 10/2003 | Bennett ................... 711/3 |
| 2004/0001498 | A1 | * | 1/2004 | Chen et al. ............... 370/401 |
| 2004/0010752 | A1 | | 1/2004 | Chan et al. |
| 2004/0105422 | A1 | | 6/2004 | Sahni et al. |
| 2004/0111519 | A1 | * | 6/2004 | Fu et al. ............... 709/229 |
| 2004/0177150 | A1 | | 9/2004 | Kogan |
| 2004/0220909 | A1 | | 11/2004 | Brown et al. |
| 2004/0249682 | A1 | * | 12/2004 | DeMarcken et al. ........... 705/5 |

* cited by examiner

*Primary Examiner*—Sheng-Jen Tsai
(74) *Attorney, Agent, or Firm*—Lee & Hayes, PLLC

(57) ABSTRACT

An inverse query engine system having a cache integrated therein and methods for maintaining the cache are described herein. Entities storing filters in the inverse query engine cache thus do not have to maintain an individual cache to maintain the filters. The inverse query engine system cache is maintained within a bounded size by removing expired filters from the cache and trimming the cache to an optimal size when the cache reaches a maximum size. In the event that filter size cannot be determined efficiently, weights may be associated with filters stored in the cache, each weight identifying an estimate of a filter size. The weights are used to determine cache size and to maintain the cache size within particular bounds.

6 Claims, 8 Drawing Sheets

FILTER TABLE MAINTENANCE

EXPIRE FILTER TABLE CACHE

Trim Filter Table Cache

INVERSE QUERY ENGINE SYSTEMS WITH CACHE AND METHODS FOR CACHE MAINTENANCE

TECHNICAL FIELD

The systems and methods described herein relate to inverse query engines, and more particularly to inverse query engines with integrated cache and cache maintenance capabilities.

BACKGROUND

Computing systems—i.e. devices capable of processing electronic data such as computers, telephones, Personal Digital Assistants (PDA), etc.—communicate with other computing systems by exchanging messages according to a communications protocol that is recognizable by the systems. To enforce security and prevent unwanted messages from entering a system, many computing systems implement security filters that screen messages entering (or, in some cases, exiting) the computing systems.

Filters are also utilized to process messages received by a service. (As used herein, different services may be included in the same process, a different process, the same machine or a different machine.) A filter is a query that returns a value of true or a value of false when tested against an input. One type of system that utilizes filters is a messaging service system that receives messages from various sources and routes those messages to different systems. For example, a financial services system can receive multiple stock quotes and route certain stock quotes to particular subscribers to the service by associating a filter with each subscriber. When a message (i.e. stock quote) is received, the message is compared to filters stored the financial services system. The message is forwarded to a subscriber if a filter associated with that subscriber is satisfied by the message. If, say, John Doe has signed up to receive stock quotes for Microsoft, then a filter associated with John Doe will be satisfied when a message containing a Microsoft quote is received. The Microsoft quote will then be forwarded to John Doe.

Multiple filters stored in a system are usually stored together in a filter table. An inverse query engine receives an input (i.e. a message) and tests that input against each of the filters (i.e. queries) in the filter table. Although the terms "filter table" and "inverse query engine" may be used interchangeably, as used herein a filter table is a data structure containing the filters and the data associated therewith, and an inverse query engine is the logic that uses the filter table to drive the comparison process. Usually, as in the examples used herein, an inverse query engine encompasses a filter table, although that may not always be so since the inverse query engine and the filter table could be stored in separate locations or even be located in separate components.

Frequently, filters are not owned or controlled by a system in which they are stored. A messaging service computer, for example, stores filters that are owned by others. At a basic level, when a subscriber tells a system which message the subscriber will receive, the subscriber has added or modified a filter in the messaging service computer.

This issue can lead to memory management problems for inverse query engine systems such as uncontrolled growth of the filter table, since other computers and users can create and store a virtually unlimited number of filters in a filter table. System efficiency is deteriorated because the inverse query engine must process an enormous amount of filters for each message—many of which are probably out of date.

General computer system processing can also be compromised if the filter table is stored in general memory (i.e. RAM) that can be utilized by other functions in the system. As more and more filters are stored in the filter table, less and less memory is available for other functions in the system. Conversely, if the memory is filled by other functions, then there may not be sufficient memory available for the filter table when it is required.

Another problem is that current inverse query engine systems are not as robust as desired by developers who create and maintain systems to work with the inverse query engine system. If the inverse query engine system does not have an integrated cache or a satisfactory solution for managing its filters, then a burden is placed upon developers of other systems to create their own solutions (e.g. cache creation and management) for maintaining their filters that are stored in the inverse query engine system.

Developers or filter owners may want their filters to remain in an inverse query engine system for limited times only, realizing that their needs will change over time or for security reasons. Some filter owners may also desire that their filters be removed from a system if the filter is not utilized for a certain period of time. The filter owners must then keep track of all other computers that store their filters and devise methods to manage the filters according to their needs, even though the filters are in the possession of other entities.

Accordingly, a more efficient and more robust solution is desirable.

SUMMARY

At least one implementation described herein relates to an inverse query engine system that has a dedicated cache and utilizes methods to maintain the cache. The dedicated, or integrated, cache stores a filter table and provides greater stability for the inverse query engine and for any system including the inverse query engine. The cache is bounded and the inverse query engine maintains the bounds of the cache by maintaining the size of the filter table. This is accomplished by expiring and/or trimming the cache. Expiring the cache entails deleting filters from the filter table that have been in the filter table for a certain period of time. Trimming the cache involves deleting one or more filters from the filter table when the cache meets or exceeds a maximum cache size to result in a cache of an optimal cache size. In at least one implementation wherein an actual filter size is undeterminable or inefficient, each filter is assigned a weight that corresponds to a best estimate of a size of the filter and a cache weight is derived by summing of all filter weights in the filter table. The weight may be assigned by an inverse query engine system or by a filter owner. Trimming is accomplished with reference to the filter weights and the cache weight instead of actual size.

BRIEF DESCRIPTION OF THE DRAWINGS

A more complete understanding of exemplary systems and methods described herein may be had by reference to the following detailed description when taken in conjunction with the accompanying drawings wherein.

DETAILED DESCRIPTION

The present disclosure relates to inverse query engine systems, and more particularly to inverse query engines that maintain a filter table in a cache integrated with the inverse query engine. In addition to the integrated cache, this disclosure describes a variety of implementations of effective cache management so that the cache does not grow to an undesirable or unmanageable size.

An inverse query engine accepts an input and tests the input against a group of queries, or filters. If the input satisfies a query, i.e. conditions defined by the query are met by the input, then the inverse query engine processes the input according to instructions associated with the query.

One use of an inverse query engine is in a messaging service, such as a news service, financial service or the like. In such services, a user subscribes to receive information that satisfies a query defined according to the user's subscription.

For example, a user may wish to receive news stories that pertain to a certain stock. The user enters a query, or filter, that is stored by an inverse query engine associated with a subscription service. A user typically does this through a user interface with the subscription service or an intermediary service, such as an Internet service provider. The subscription service receives messages regarding financial news items and the inverse query engine tests the messages against each filter that it stores. If the user's filter returns a true value with respect to a message, then the message is sent to the user.

In this example, if the news item is about the certain stock of interest to the user, the message satisfies the query and the news item of interest to the user will be sent to the user. Since the user's query is stored with the subscription service, messages matching the query are returned on a continued basis as long as the user subscribes to the subscription service.

Figure 1:
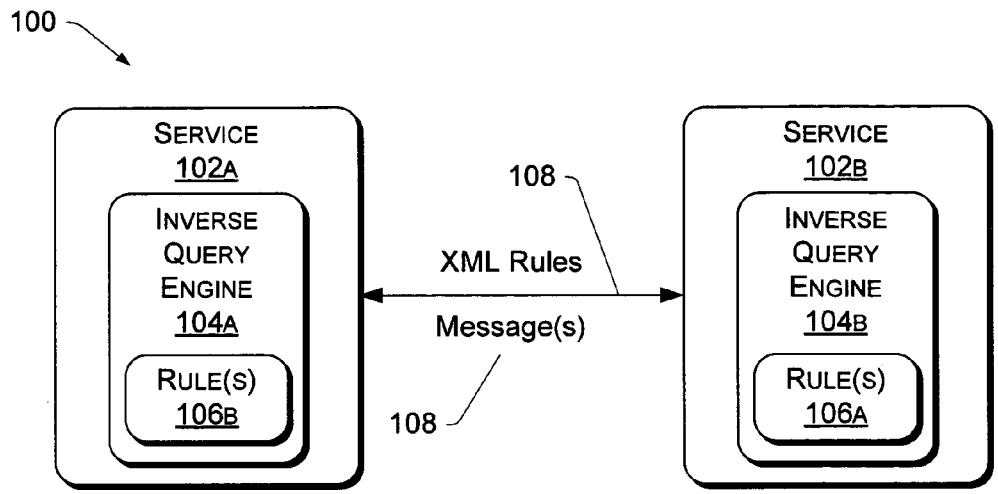
FIG. 1 is a block diagram of a prior art system depicting services that include inverse query engines and rules/filters of other services.

FIG. 1 is a block diagram of an exemplary prior art arrangement whereby multiple services maintain inverse query engines with filters. A first service 102a includes a first inverse query engine 104a and a second service 102b includes a second inverse query engine 104b. The services 102 send messages 108 back and forth over a communication channel 110. These messages are arranged according to a particular messaging format, such as an eXtensible Markup Language (XML) format.

The services 102 also transmit filters 106a, 106b to each other, the filters defining queries that apply to the respective sending services 102. Note that the filters 106b stored by the first service 102a are associated with the second service 102b, and that the filters 106a stored by the second service 102b are associated with the first service 102a.

Figure 2:
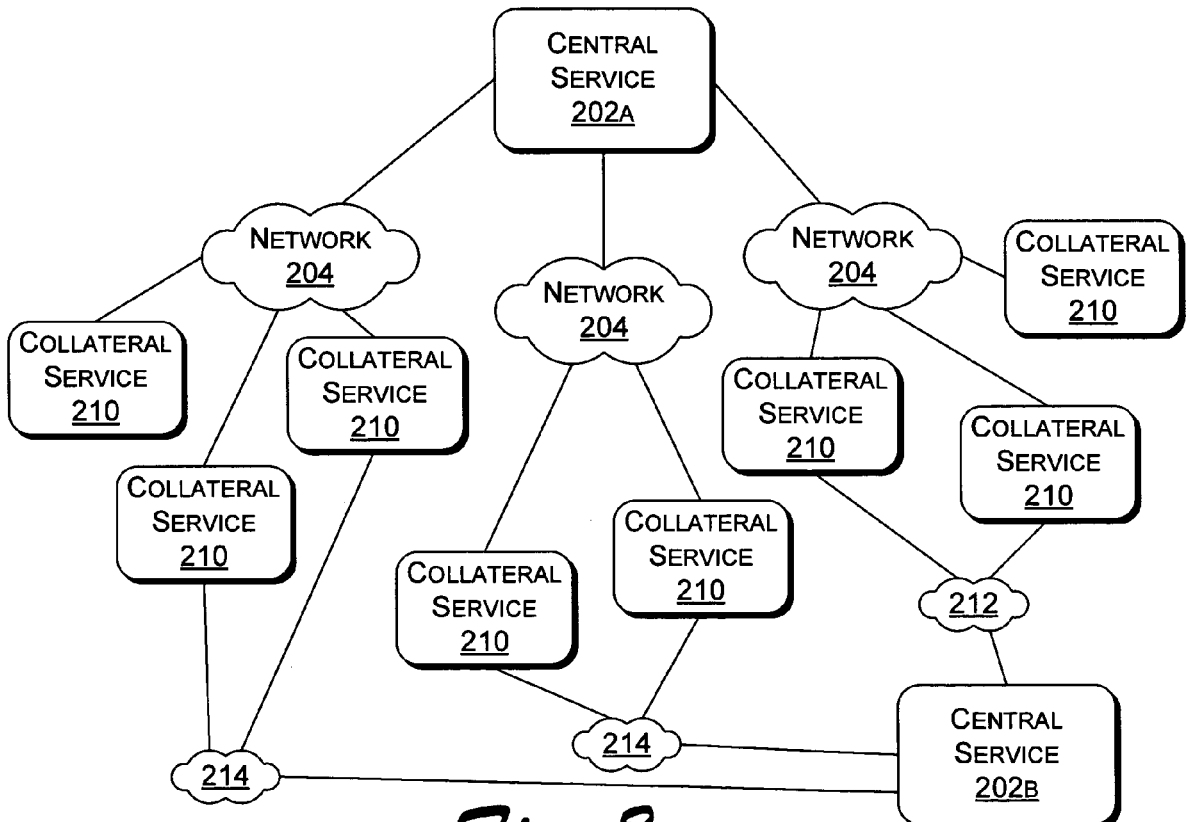
FIG. 2 is a diagram of a prior art communications structure between multiple services via multiple networks.

Over time, the number of filters contained in the filter table increase, thereby increasing the size of the filter table. Prior art FIG. 2 illustrates how the filter table can grow quickly over a short period of time. A first central service 202a and a second central service 202b communicate with a number of collateral services 204 over a number of networks 206. Also, each collateral service 204 communicates with each of the other collateral services. Each central service 202 and collateral service 204 maintains a filter table (not shown) that stores multiple filters for each of the other central services 202 and collateral services 204. Although the services shown in FIG. 2 are identified as being resident on different entities, it is noted that services may be resident within a single process or within a single machine.

Even with this small, simplified illustration, it is easy to see how filter tables can grow unmanageably large and can contain filters that become out of date and are no longer used. In practice, this example is multiplied hundreds and thousands of times just over the Internet. Not only is it a burden for services to host unmanageably large filter tables, it is a burden on services to update or remove filters owned by them that are stored in filter tables of other services. This situation also causes problems with memory management for service systems. If the filter table is stored in memory used by other applications, the memory may be drastically reduced by an enormous filter table thus adversely affecting the system.

The inverse query engine systems described herein solve several problems associated with the prior art. For one, an inverse query engine that includes a cache that is used exclusively by the inverse query engine optimizes inverse query engine operations and general system operations, since the cache is of a bounded size and cannot be used by other applications. Also, in such an architecture the inverse query engine does not use memory that is needed by other system applications.

It necessarily follows that providing a cache integrated with an inverse query engine will require that the cache size be maintained at a size less than or equal to the size of the cache. The implementations described herein disclose several ways in which that may be done without requiring services that own filters stored in the cache to maintain their individual filter. These implementations are described in greater detail below with respect to subsequent figures.

Exemplary Computer System

Figure 3:
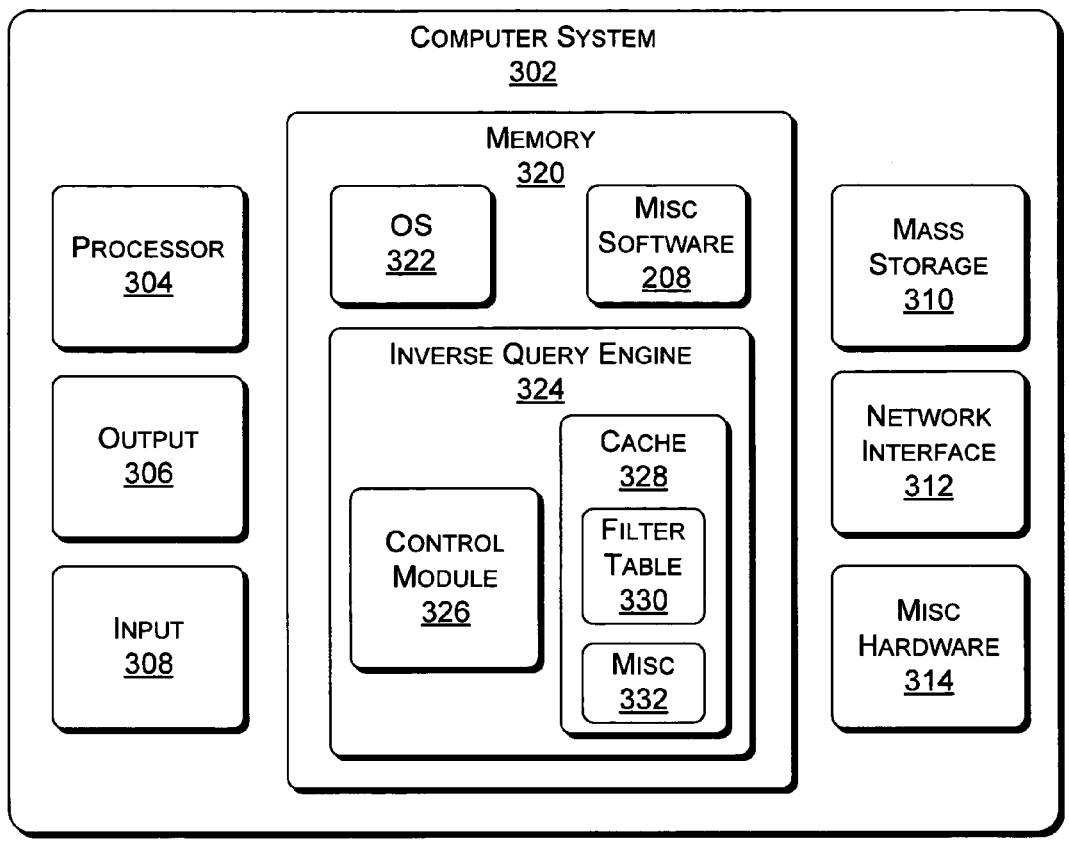
FIG. 3 is a block diagram of an exemplary computer system having an inverse query engine in accordance with the implementations described herein.

FIG. 3 is a block diagram of an exemplary computer system 302 that includes an inverse query engine 324. The computer system 302 also includes a processor 304, output means 306 and input means 308 that allow the computer system 302 to receive data (e.g. from a mouse, keyboard, etc.) and to send data (e.g. to a printer, etc.). The computer system 302 also includes a mass storage device 310 (e.g. a hard disk drive, etc.), a network interface 312 (e.g. a network card, modem, etc.) and other miscellaneous hardware 314 typically required for a computer system to function.

The computer system 302 also includes memory 320, such as Random Access Memory (RAM), in which the inverse query engine 324 is stored. The memory 320 also stores an operating system 322 and other miscellaneous software 208 that may be required for the computer system 302 to function properly.

The inverse query engine 324 includes a control module 336 and a cache 332 integrated therewith. The cache 328 stores a filter table 330 and miscellaneous module 332 that includes several program, routines or sub-modules necessary for implementation of the systems and methods described herein. Although the cache 328 is shown stored in RAM 320, it is noted that the cache may be stored in any practical memory location, such as in Read Only Memory (ROM) (not shown) or on the mass storage device 310. An inverse query engine and its components are discussed in greater detail below.

It is noted that although the inverse query engine 324 is shown as being the only inverse query engine in the computer system 302, it is noted that the inverse query engine 302 could be integrated within a discrete service within the computer system 302. In such an instance, another discrete service having its own inverse query engine could be maintained on the computer system 302. Any practical number of inverse query engines could be present within the computer system 302.

Exemplary Inverse Query Engine

Figure 4:
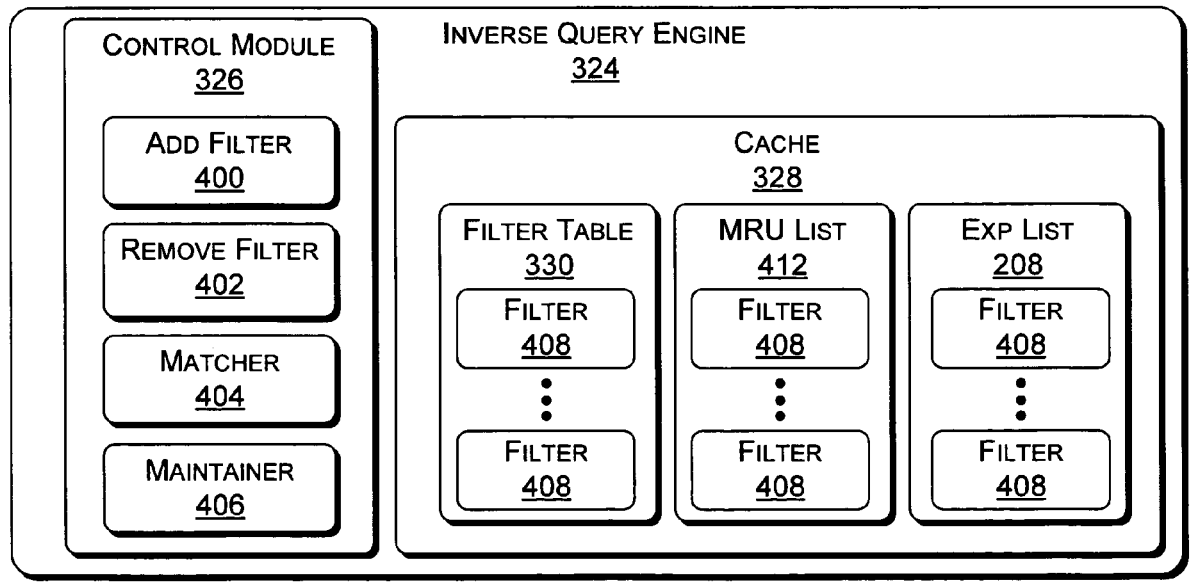
FIG. 4 is a block diagram of an exemplary inverse query engine.

FIG. 4 is a block diagram of an exemplary inverse query engine 324 similar to that shown in FIG. 3 and discussed above. The inverse query engine 324 includes a control module 326 and a cache 328. The control module 326 includes an add filter module 400, a remove filter module 402, a matcher 404 and a maintainer 406.

The cache 328 stores a filter table 330 that includes multiple filters 408, a recently used list 412 that identifies when multiple filters 408 were last used, and an expiration list 208 that identifies expiration times of multiple filters 408.

The add filter module 400 controls functions necessary to receive and add a filter 408 to the filter table 330. The remove filter module 402 controls functions necessary to remove a filter 408 from the filter table. The matcher 404 processes messages received by the inverse query engine 324 to determine if the messages satisfy any filters 408 stored in the filter table 330.

The maintainer 406 controls cache/filter table maintenance, i.e. the size of the filter table 330 using, inter alia, the most recently used list 412 and the expiration list 208. As will be discussed in greater detail below, the maintainer 406 is configured to expire the filter table 330 by removing one or more filters 408 that have expired.

The maintainer 406 is also configured to trim the filter table 330—hence, the cache 328—by determining when the cache 328 has grown to a specified maximum size or capacity. The size of the cache 328 may be indicated by a size of the filter table 330, by the cache 328 usage, or by any other method known in the art. When such a determination is made, the maintainer 406 is configured to remove one or more filters 408 until the cache 328 is reduced to an optimal size.

Elements of the inverse query engine 400 and their functions are explained in more detail below with respect to subsequent figures. In the following examples, reference is made to elements and reference numerals in previous figures.

Exemplary Filter

Figure 5:
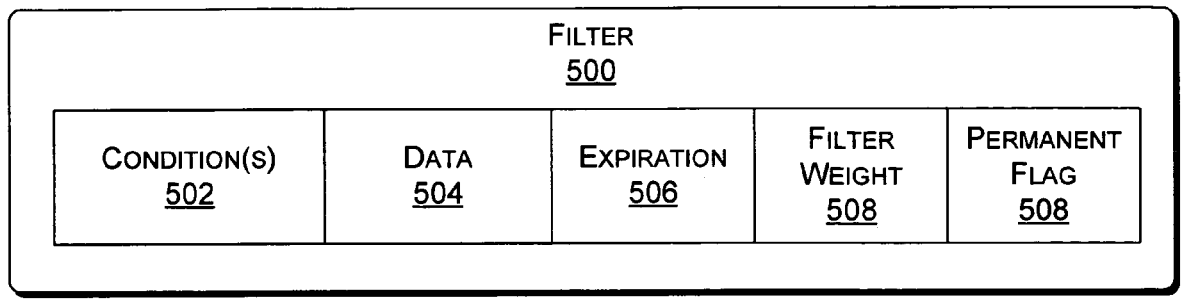
FIG. 5 is a depiction of an exemplary filter.

FIG. 5 depicts an exemplary filter 500 that may be used in one or more of the implementations of the inverse query engine 400 described herein. The filter 500 includes several fields 502-508 that include filter information utilized by the inverse query engine 400. A condition field 502 identifies one or more conditions—also known as rules—that define input that satisfies the filter 500. In other words, the conditions 502 specify which messages input into the inverse query engine 400 will match the filter 500.

For instance, in the example given above regarding the stock quote message, the condition field 502 contains a Boolean expression that includes the stock identified by the user. That expression returns a value of true if the stock identified in the message is the same as the stock identified in the expression. As a result, the message would match—or satisfy—the filter 500 and the message would then execute instructions included in a data field 504 of the filter 500.

The data field 504 of the filter 500 includes executable instructions that are executed when the condition(s) 502 are satisfied. The data field 504 may include instructions, objects, etc. For example, the data field 504 may include instructions for the inverse query engine to send a message to User "X" if the message matches expressions in the condition field 502. The variety of information that may be contained in the data field 504, however, creates a problem of determining the size of a filter, a problem that is addressed in greater detail below.

The filter 500 also includes an expiration field 506, a filter weight field 508 and a permanent flag 510. The expiration field 506 stores an expiration time that identifies a date and/or time at which the filter expires and may be removed from the filter table. An owner of the filter can set this value based on the needs of the owner's service. For example, a filter may be set to expire in thirty days, in two weeks, at two o'clock p.m., etc. The filter owner may do this to ensure that the owner's filters are kept up to date so that, for example, messages aren't sent to a previous subscriber in error. The expiration field 506 is explained in more detail with respect to FIG. 11, below.

The permanent flag 510 is a Boolean field that, when set, indicates that the filter 500 is not to be removed from the filter table in a cache maintenance operation. Setting the permanent flag 510 essentially overrides the cache maintenance operations described herein (e.g. expiring, trimming) if the filter owner is certain that it is beneficial for the filter to remain in a system for an indefinite period of time. That notwithstanding, a permanent filter may include an expiration date at which time the permanent filter may be removed from the cache. In such a case, the permanent filter could be removed in an expire cache operation but not in a trim cache operation.

The filter weight field 508 may be used to store a filter weight value assigned to the filter 500 by the inverse query engine 400 in situations wherein the size of the filter 500 cannot be practically determined (the size of the filter depends directly on the size of the data field 504, since the difference in the size of the other parts of filters is typically negligible). In cases where processing overhead is too expensive to determine the exact size of a filter (due to the range of data that may be stored in the data field 504), the inverse query engine 400 may be configured to assign a filter weight value to a filter based on an estimate of the size of the filter. There may also be other scenarios in which it is virtually impossible to determine the exact size of the filter.

For example, in at least one implementation, the data field 504 is a .NET ("dot net") runtime object. .NET technology is a set of software technologies promulgated by Microsoft Corp. that facilitates network communication between computer systems and is suited for use in messaging service systems. Implementations of .NET technology are known in the art.

In a case where the data field 504 is a .NET runtime object, the data stored in the data field 504 could be an object with an arbitrary object hierarchy/graph subordinate thereto. The .NET object in the data field 504 references each object in the hierarchy and those objects can reference other objects, and so on. The actual memory usage of the .NET object in the data field 504 is a sum of all objects referenced by the .NET object and its subordinate objects. To determine the actual memory usage would require a graph traversal solution that may be prohibitively expensive. Also, since .NET code is compiled on a just-in-time basis, memory usage can also depend on the computer system and the operating system being used.

Actual values of in the filter weight field 506 vary depending on the implementation. The values can be implemented on a simple "Small, Medium, Large" basis, or the values may be assigned an integer value of, for example, 2 (two) to 64K (sixty-four thousand). In one particular implementation, filters are assigned weights of from one (1) to five (5), with a default weight of one (1).

It is noted that the filter weight may be determined by an inverse query engine system when it receives the filter, or the filter weight may be determined by a filter owner and associated with the filter before the filter is transmitted to the inverse query engine system, since the filter owner is in a better position to estimate the size of the filter. To ensure that all filter weights in a system can be reliably compared to each other, the filter weights may be determined according to a general standard or a standard associated with the inverse query engine system.

Even if the exact size of the filter cannot be determined, an estimation of the size works to prevent a "runaway" cache, wherein the cache size grows too large for efficient practical applications. Efficient estimation methods can be used to estimate a filter size with sufficient accuracy to comport with the objects of the systems and methods described herein.

In at least one implementation, filter weights are not assigned to permanent filters (i.e. a permanent filter is assigned a filter weight of "0"). In some instances, developers may wish to maintain permanent filters separate and apart from non-permanent filters. Other implementations, however, use permanent filter weights in cache maintenance operations.

Further discussion of filter weights will be discussed in greater detail below, with respect to one or more methodological implementations of the systems described herein.

Exemplary Most Recently Used List

Figure 6:
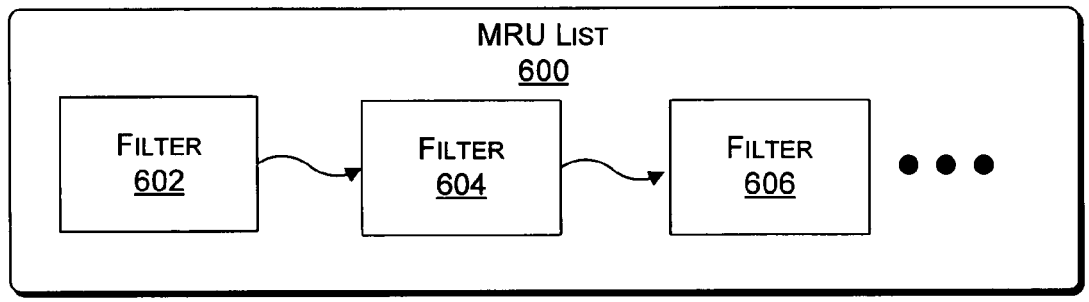
FIG. 6 is a depiction of an exemplary Most Recently Used (MRU) filter list.

FIG. 6 is a simplified diagram of an exemplary most recently used (MRU) list 600. The MRU list 600 includes filter identifiers 602-606 in an order sorted according to a relative time of usage of filters associated with the filter identifiers 602-606. A filter is considered to be "used" if it matches a given input or when it is first added to the filter table. Although only three filter identifiers 602-606 are shown, it is noted that virtually any number of filter identifiers may be included in the MRU list 600.

It is noted that although a relative time of usage is used to sort the MRU list 600, there is no need to store an actual time of usage, since the absolute time is not required in this processing. Once sorted, the relative time of usage of the filters is established. Notwithstanding the foregoing, one or more implementations that include actual usage times may be used in accordance with the systems and methods described herein. The usage times may be used in a list—either sorted or non-sorted—or without a list wherein filters themselves (or some other location) may include a last time of usage.

A filter associated with filter identifier 602 is the filter that has been most recently used. A filter associated with filter identifier 604 is has been used less recently that the filter associated with filter identifier 602, but more recently than a filter associated with filter identifier 606.

In implementations defined more fully below, the inverse query engine 400 refers to the MRU list 600 in reverse order to determine which filters have been least recently used. Such filters may be chosen to be removed from the cache before other filters that have been used more recently. This concept is explained in greater detail below, with respect to flow diagrams depicted in subsequent figures.

In at least one implementation, permanent filters are not added to the MRU list 600 when the permanent filters are added to the filter table. This prevents a permanent filter from being removed from the filter table during an expire cache or trim cache procedure. In an alternative implementation, a permanent filter could be added to the MRU list 600 but the status of each filter in the MRU list would have to be verified before a removing step in the expire cache or trim cache process.

Exemplary Expiration List

Figure 7:
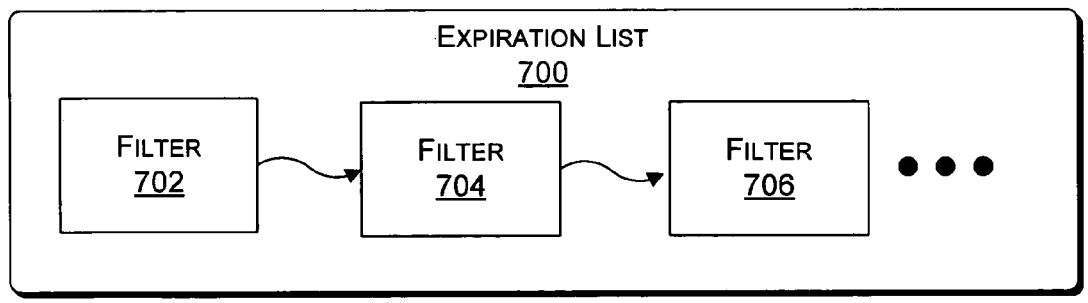
FIG. 7 is a depiction of an exemplary expiration list.

FIG. 7 is a simplified depiction of an exemplary expiration list 700 in accordance with systems and methods described herein. The expiration list 700 includes filter identifier 702, filter identifier 704 and filter identifier 706. Each filter identifier 702-706 identifies a filter 422 stored in the filter table 420. Each of the filters 422 identified by the filter identifiers 702-706 in the expiration list 700 includes an expiration value in the expiration field 506 (FIG. 5).

The filter identifiers 702-706 may be sorted according to expiration times of the filters identified thereby. If the expiration list 700 is so sorted, then filter identifier 702 identifies a filter that has an expiration time that will occur sooner than expiration times in filters identified by the other filter identifiers 704, 706. Likewise, filter identifier 706 identifies a filter having an expiration time that will occur after the expiration times in the filters identified by filter identifier 702 and filter identifier 704.

As previously stated, each filter 422 in the filter table 420 does not necessarily include an expiration value. But if a filter does include an expiration value, then that filter is identified as one of the filters 702-706 in the expiration list 700. The expiration list 700 is monitored by the inverse query engine 400 to determine when a filter identified in the expiration list 700 has expired and thus should be removed from the filter table 420.

It is also noted that filters that do not include an expiration value may also be expired (removed) from the filter table 420 in another manner even though they may not be identified in the expiration list 700. The expiration process will be described in greater detail below with reference to subsequent flow diagrams.

Exemplary Maintainer

Figure 8:
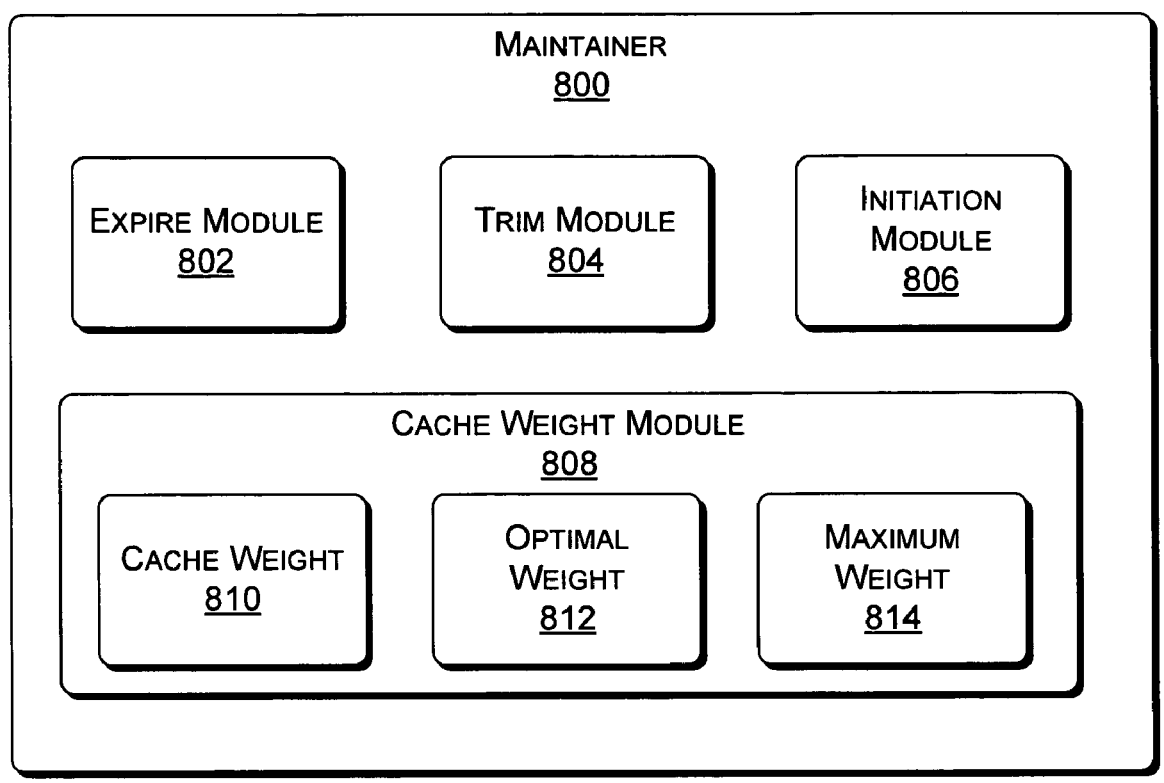
FIG. 8 is a block diagram of an exemplary maintainer in accordance with an implementation described herein.

FIG. 8 is a block diagram of an exemplary maintainer 800 in accordance with one or more implementations described herein. The maintainer 800 includes an expire module 802 and a trim module 804. The expire module 802 and the trim module 804 are configured to remove certain filters from the filter table upon the occurrence of one or more triggering events, described below.

The maintainer 800 also includes a cache weight module 808 that stores a cache weight 810, an optimal weight 812 and a maximum weight 814. The cache weight 810 is a sum of all filter weights 508 (FIG. 5) included in the filter table 420 stored in the cache 400 (see FIG. 4). The optimal weight 812 identifies a largest size of the filter table 420 that is desirable for typical operation. The maximum weight 814 is a weight that denotes a filter table size that is large enough to trigger a cache trimming operation. In at least one implementation described herein, the expiration module 802 and the trim module 804 perform a cache expiration operation and a cache trimming operation, respectively, when the filter table reaches the size corresponding to the maximum weight 814. The cache trimming operation removes filters from the filter table until the filter table reaches the optimum weight 804.

Exemplary Methodological Implementation: Cache Maintenance

Figure 9:
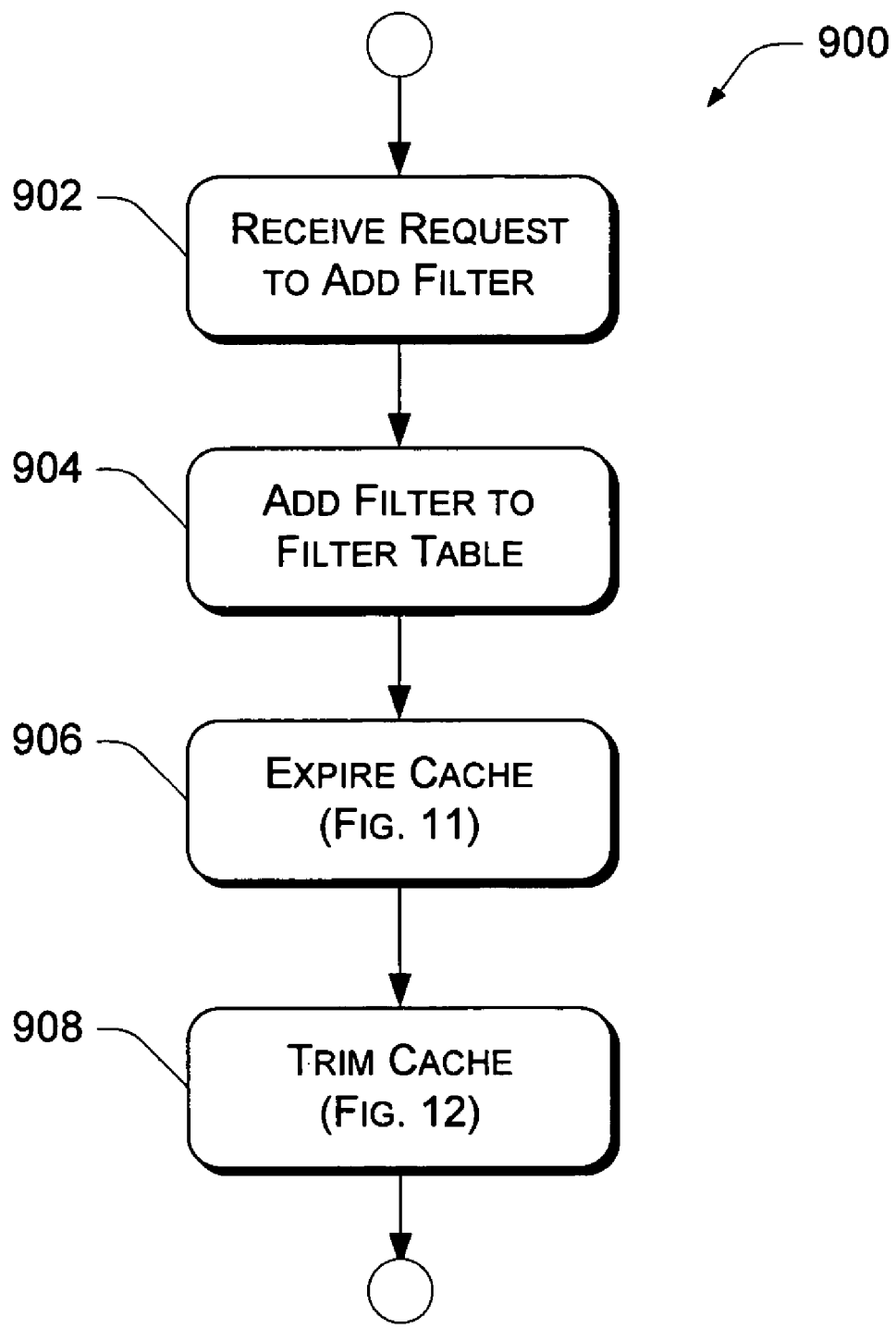
FIG. 9 is a flow diagram depicting an exemplary methodological implementation of filter table maintenance.

FIG. 9 is a flow diagram 900 that depicts an exemplary methodological implementation of maintaining an inverse query engine cache. In the discussion of the flow diagram 900 below, continuing reference will be made to elements and reference numerals shown and described previously.

At block 902, the inverse query engine 400 receives a filter 422 to be added to the filter table 420 in the cache 404 associated with the inverse query engine 400. The add filter 406 module of the control module 402 receives and adds the filter 422 to the filter table 420 at block 904.

At block 906, the control module 402 invokes the expire module 802 of the maintainer 410, 800 to expire the cache 404. As used herein, reference to "expiring the cache" is equivalent to "expiring the filter table." Reducing the number of filters in the filter table necessarily reduces the cache—not in a physical sense, but in the sense that less of the cache is utilized. Expiring the cache 404 entails traversing filters 430 identified in the expiration list 428 and removing any filter having an expiration time that has passed. The cache expiring process is discussed in detail below with respect to FIG. 10.

After the cache 404 has been expired, the maintainer 412 trims the cache 404 at block 908. Trimming the cache 404 involves reducing the number of filters 422 that are stored in the filter table 420. The size of the filter table 420 is reduced, thereby reducing the amount of the cache 404 that is utilized. The cache trimming process is discussed in detail below with respect to FIG. 11.

Exemplary Methodological Implementation: Expire Cache Operation

Figure 10:
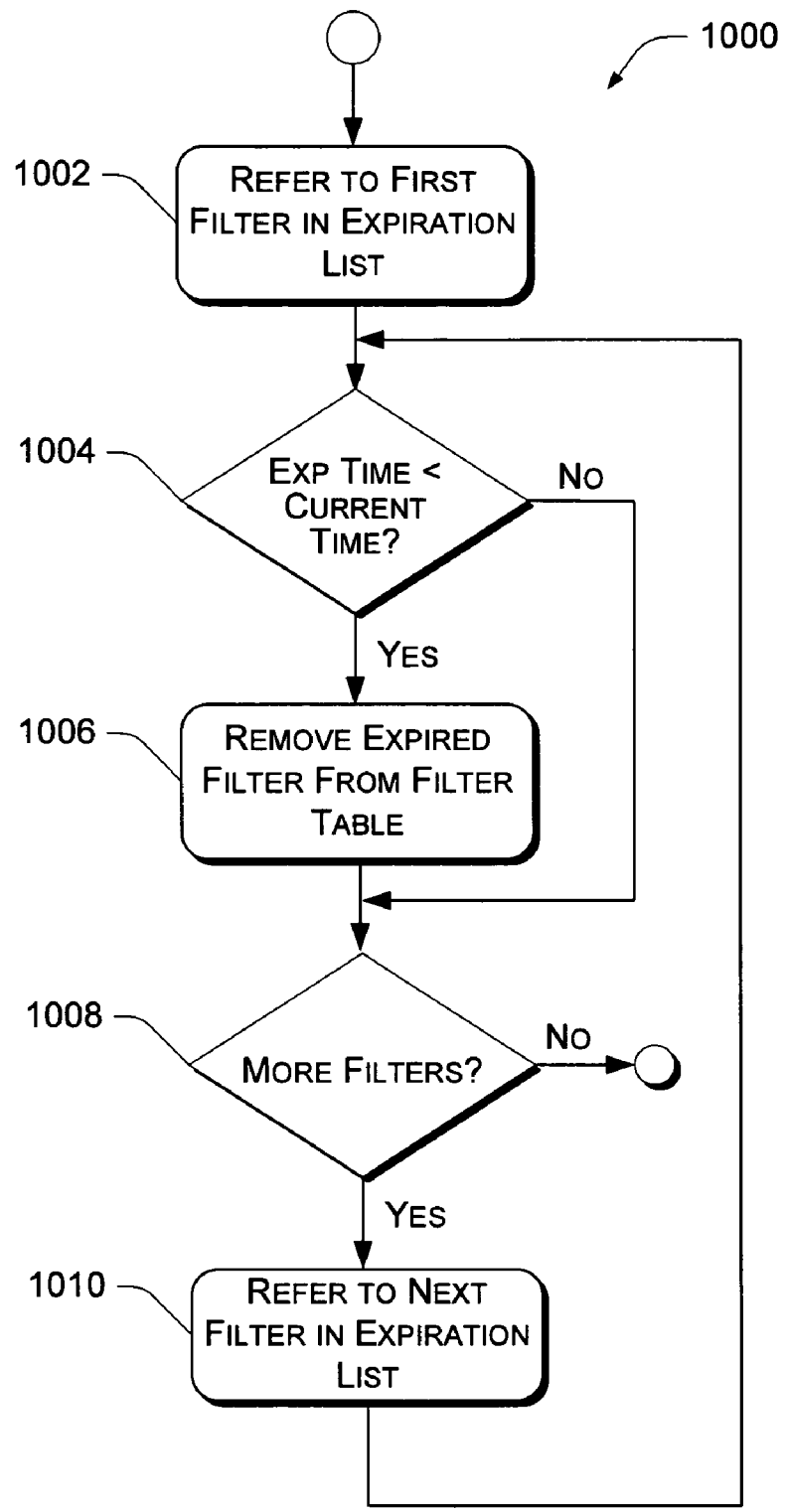
FIG. 10 is a flow diagram depicting an exemplary methodological implementation of an "expire filter table" step from FIG. 9.

FIG. 10 is a flow diagram 1000 that depicts an exemplary methodological implementation of a cache expiration operation. When the maintainer 412 expires the cache 404, filters 422 in the filter table 420 that include an expiration time that has passed are removed from the filter table 420. The size of the filter table 420 is thereby reduced as is the amount of the cache 404 that is utilized. The physical size of the cache 404 remains the same, but more of the cache 404 is available to store new filters that are added to the filter table 420.

In the following example, it is assumed that the expiration list 700 is sorted according to expiration times, with filter expiring soonest being identified at the front of the expiration list 700. It is noted, however, that other implementations may accomplish the same result utilizing an unsorted expiration list. As is shown in the following example, utilizing a sorted expiration list is efficient because once a filter is identified in the expiration list that has not expired, the process may terminate, since no subsequent filter will have an earlier expiration time.

At block 1002, the expiration module 802 of the maintainer 800 references the first filter identifier 702 stored in the expiration list 700. If an expiration field value 506 in a filter associated with the first filter identifier 702 is earlier than a current time ("Yes" branch, block 1004), then the filter 422 identified by the first filter identifier 702 is removed from the filter table 420 (block 1006). If the expiration field value 506 has not yet occurred ("No" branch, block 1004), the filter 422 associated with the first filter identifier 702 is not removed from the filter table 420 and the process terminates at block 1020.

If there are more filters 422 in the filter table 420 ("Yes" branch, block 1008), then the expiration module 802 references a next filter identifier 704 stored in the expiration list 700 at block 1010. The process then repeats from block 1004 with the next filter. If there are no more filter identifiers in the expiration list ("No" branch, block 1008), the process terminates at block 1020.

The specific example described above is not meant to exclude other implementations that may be used to expire the cache. In one implementation, the maintainer 412 is configured to expire the cache by removing any filters that have been stored in the filter table 420 for longer than a specified period of time. In another implementation, the expiration process terminates when a sufficient number of filters has been removed from the filter table. Other implementations not described herein may also be used within the scope of the claims appended hereto.

Exemplary Methodological Implementation: Trim Cache Operation

Figure 11:
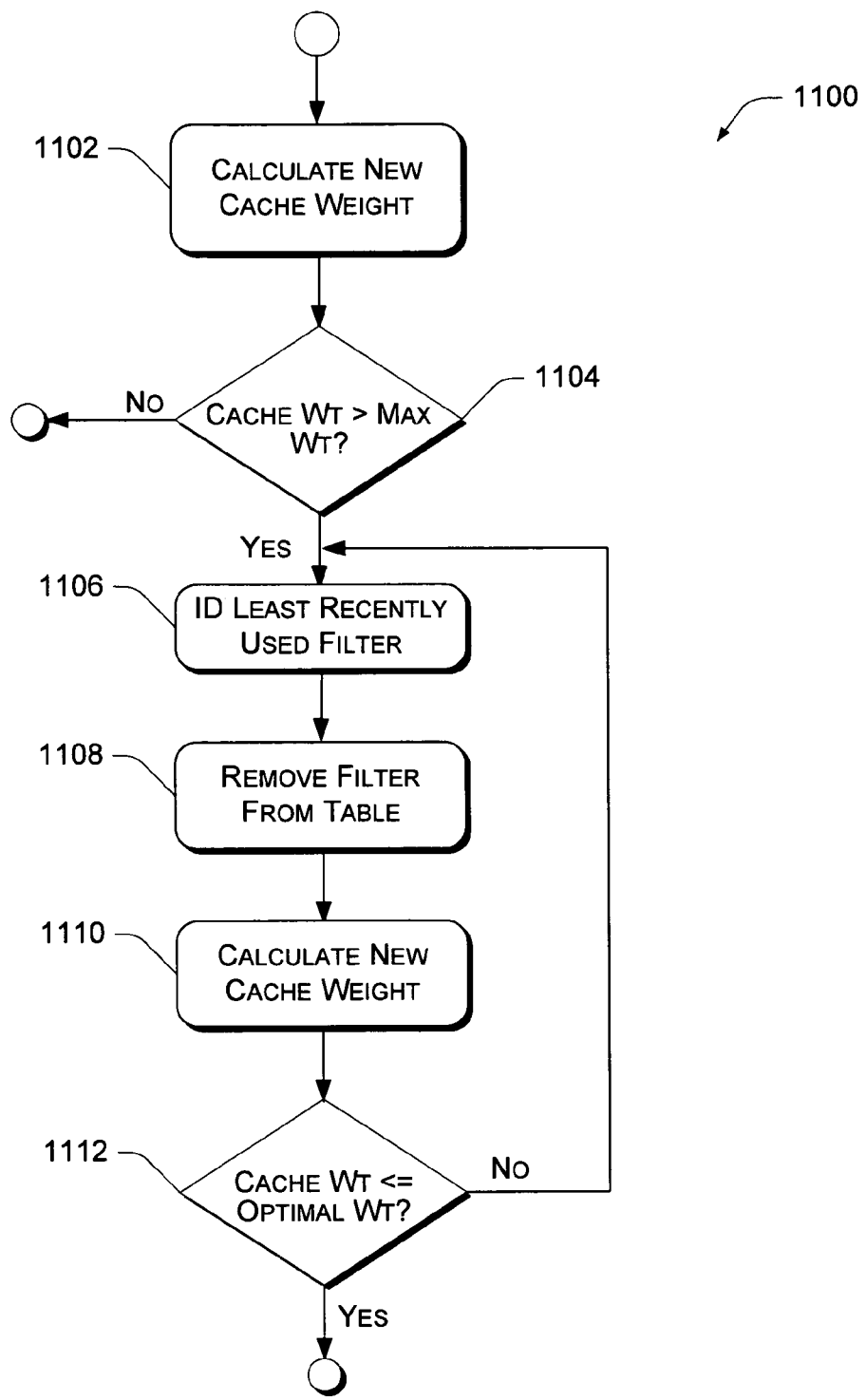
FIG. 11 is a flow diagram depicting an exemplary methodological implementation of a "trim cache" step from FIG. 9.

FIG. 11 is a flow diagram 1100 that depicts an exemplary methodological implementation of a cache trimming operation. To trim the cache 404, the trim module 804 of the maintainer 800 determines a cache weight 810. If the cache weight 810 has attained the maximum weight 814, then the trim module 804 removes one or more filters 422 from the filter table 420 until the cache weight 810 has been reduced to the optimal weight 812.

In the example described in FIG. 11, the concepts of a cache weight and filter weights are implemented. As previously discussed, if it is efficient to determine an actual size of filters in the filter table (i.e. memory used by the filters), then the actual sizes may be used in lieu of weights. The methodology for using the actual sizes is similar to that for using weights. However, it is often impossible to efficiently determine actual sizes of filters and, hence, the filter table. In such cases, using the weights method described herein is beneficial.

When a new filter is added to the filter table (block 904, FIG. 9) and the trim cache procedure is invoked (block 908, FIG. 9), the maintainer 800 calculates the cache weight 810 by summing the filter weights (508, FIG. 5) for all filters 422 in the filter table 420 (FIG. 4) at block 1102. It is noted that the summing process may merely consist of adding the new filter weight to the cache weight. At block 1104, the cache weight 810 is compared to the maximum weight 814, which has been predefined. If the cache weight does not exceed the maximum weight ("No" branch, block 1104), then the process terminates. If the cache weight is greater than or equal to the maximum weight ("Yes" branch, block 1104), then the trim module 804 identifies the least recently used filter (block 1106) and removes the filter at block 1108. The least recently used filter is identified by determining which filter is associated with a filter identifier that is last in the MRU list 600 (FIG. 6).

It is noted that if a particular implementation adds references to permanent filters to the MRU list, then a provision would have to be included to prevent the filter removing step from removing a filter that is identified as a permanent filter. However, if the MRU list does not reference permanent filters, then such a step is not required.

After a filter has been removed at block 1108, a new cache weight is calculated at block 1110. The new cache weight 810 is then compared to the optimal weight 812 (block 1112). If the new cache weight 810 is less than or equal to the optimum weight 812 ("Yes" branch, block 1112), then the process terminates. If the new cache weight 810 is greater than the optimal weight 812 ("No" branch, block 1112), then the process reverts to block 1106, where the next least recently used filter is identified for possible removal. This process repeats until the cache weight 810 is less than or equal to the optimal cache weight 812.

It is noted that the particular steps outlined in the flow diagram 1100 are but one implementation of a cache trimming operation. Other logic may be utilized or steps described above may be performed in some other order. The specific example depicted in the flow diagram 1100 is not intended to limit the scope of the claims appended hereto.

Exemplary API (Application Programming Interface) Elements

The following exemplary API elements provide examples of constructors, properties and methods that may be used in particular systems to implement the systems and methods described herein. The exemplary API elements described below describe only one of many ways to implement the concepts described herein. The following examples are written in the C# language. Similar elements can be readily derived in other programming languages.

It is noted that the following examples refer to a filter table or filter cache that is arranged in a hierarchical tree structure. The filter hierarchy structure is described in U.S. patent application Ser. No. 10/781,390 by the present Applicants and assigned to the same Assignee as the present application and filed on Feb. 18, 2004.

A filter table arranged in a hierarchical tree structure (i.e. Class FilterTable or Class FilterHierarchy in Microsoft® Message Bus™ implementation) provides an efficient way to add and remove filters to or from a filter table and search the filter table for matches against an input. Details of filter hierarchy systems and methods are described in the previously referenced patent application.

Briefly, a filter hierarchy is an in-memory tree of string segments where each node in the tree may contain zero or more filters. Each filter has a segment path that places it at a particular node in the hierarchy. Superior nodes in the tree structure identify common segment paths of nodes that are inferior to them. Traversing the tree to find matches is more efficient because each filter does not have to be individually tried against the input. If, during a matching process, a non-matching segment is found at a node in the hierarchy, the traversal of the remainder of that branch of the tree can be omitted.

The following examples describe how various operations including the expire cache process (FIG. 10) and the trim cache process (FIG. 11) may be implemented in a system that utilizes a filter hierarchy cache.

(Constructor) public FilterHierarchyCache (int optimalWeight, int maximumWeight);

This constructor may be used to initialize a new instance of the FilterHierarchyCache class (i.e. an inverse query engine cache) with specified maximum and optimal weights as described above, within which the filters contained will be automatically trimmed down to the optimal weight if the maximum weight is exceeded. The parameter optimalWeight: System.Int32 identifies the optimal weight to which the FilterHierarchyCache will be trimmed as a 32-bit integer. The parameter maximumWeight: System.Int32 identifies the maximum weight of the FilterHierarchyCache as a 32-bit integer.

(Constructor) public FilterHierarchyCache (int optimalWeight, int maximumWeight, bool autoPrune, bool autoTrim);

This constructor may be used to initialize a new instance of the FilterHierarchyCache class that specifies whether empty nodes will be pruned off the hierarchy automatically and whether the filters it contains will be trimmed down to a specified optimal weight if a specified maximum weight is exceeded. The optimalWeight and maximumWeight parameters are as described above. The autoPrune: System.Boolean parameter is set to true to automatically remove empty nodes from the FilterHierarchyCache, and false not to remove them automatically.

(Property) public bool AutoTrim {get; set;}—gets or sets a value specifying whether filters will be trimmed automatically from the filter hierarchy. The FilterHierarchyClass will automatically remove filters if true. This trimming behavior is automatic in the sense that whenever a Filter is added to the FilterHierarchyCache using the Add method (shown below), the trim module 804 of the maintainer 800 is called. If the MaximumWeight of the FilterHierarchyCache is exceeded, expired filters will be removed first and then the least recently used filters will continue to be removed until the OptimalWeight is reached.

(Property) public int MaximumWeight {get; set;}—gets or sets the weight above which the cached filters in the hierarchy will be trimmed.

(Property) public int OptimalWeight {get; set;}—gets or sets the weight to which the filter table is trimmed after reaching the maximum weight.

(Property) public int Weight {get}—gets the cache weight of a filter table, i.e. a filter hierarchy.

(Method) public override FilterHierarchyNode Add (string[ ] path, Filter filter);

This method can be used to add a filter with a specified name to the filter table in the cache at a specified location within the filter table, with a default weight of 1. The path: System.String[ ] parameter identifies the path to locate the place of the filter within the filter table. The filter:System.MessageBus.Filter parameter identifies the filter to be added to the filter table. The FilterHierarchyNode value returns the location of the filter added to the filter table.

(Method) public virtual FilterHierarchyNode Add (string [ ] path, Filter filter, int weight);

When overridden in a derived class, this method adds a filter to the cached filter table at a specified location and with a specified weight. In addition to the parameters included in the immediately preceding example, the parameter weight: System.Int32 identifies a weight to be assigned to the added filter.

(Method) public virtual FilterHierarchyNode Add (string [ ] path, Filter filter, int weight, DateTime utcExpiresAt);

When overridden in a derived class, this method adds a filter to the cached filter table at a specified location with a specified weight and specifies a time when the filter will expire. In addition to the parameters included in the immediately preceding example, the parameter utcExpiresAt: System.DateTime identifies the time at which the filter will expire.

(Method) public virtual FilterHierarchyNode Add (string [ ] path, Filter filter, int weight, DateTime utcExpiresAt, bool permanent);

This method is similar to the method immediately preceding method but includes a permanent: System.Boolean parameter. When this parameter is set, the filter is not removed in a cache trimming operation unless the filter has expired. If not set, the filter may be removed based on the least recently used criterion described above.

(Method) public void Expire ( );

This method removes expires filters from the cached filter hierarchy (as in the "expire cache" method described above with regard to FIG. 10).

(Method) protected virtual void OnFilterRemoved (FilterHierarchyNode node, Filter filter);

When overridden in a derived class, this method is invoked whenever a filter is removed from a cached filter table. Parameters include:

node: System.MessageBus.FilterHierarchyNode—the filter hierarchy node in the cached hierarchy containing the filter that is to be removed.

filter: System.MessageBus.Filter—identifies the filter that is to be removed.

(Method) public override void Remove (FilterHierarchyNode node);

This method removes a specified node from the cached hierarchy, i.e. removes a specified filter from the filter table. The parameter node: System.MessageBus.FilterHierarchyNode identifies a node to be removed.

(Method) public virtual void Trim (int desiredWeight);

When overridden in a derived class, this method can be used to reduce the filter table cache to a desired weight.

Exemplary Computer Environment

Figure 12:
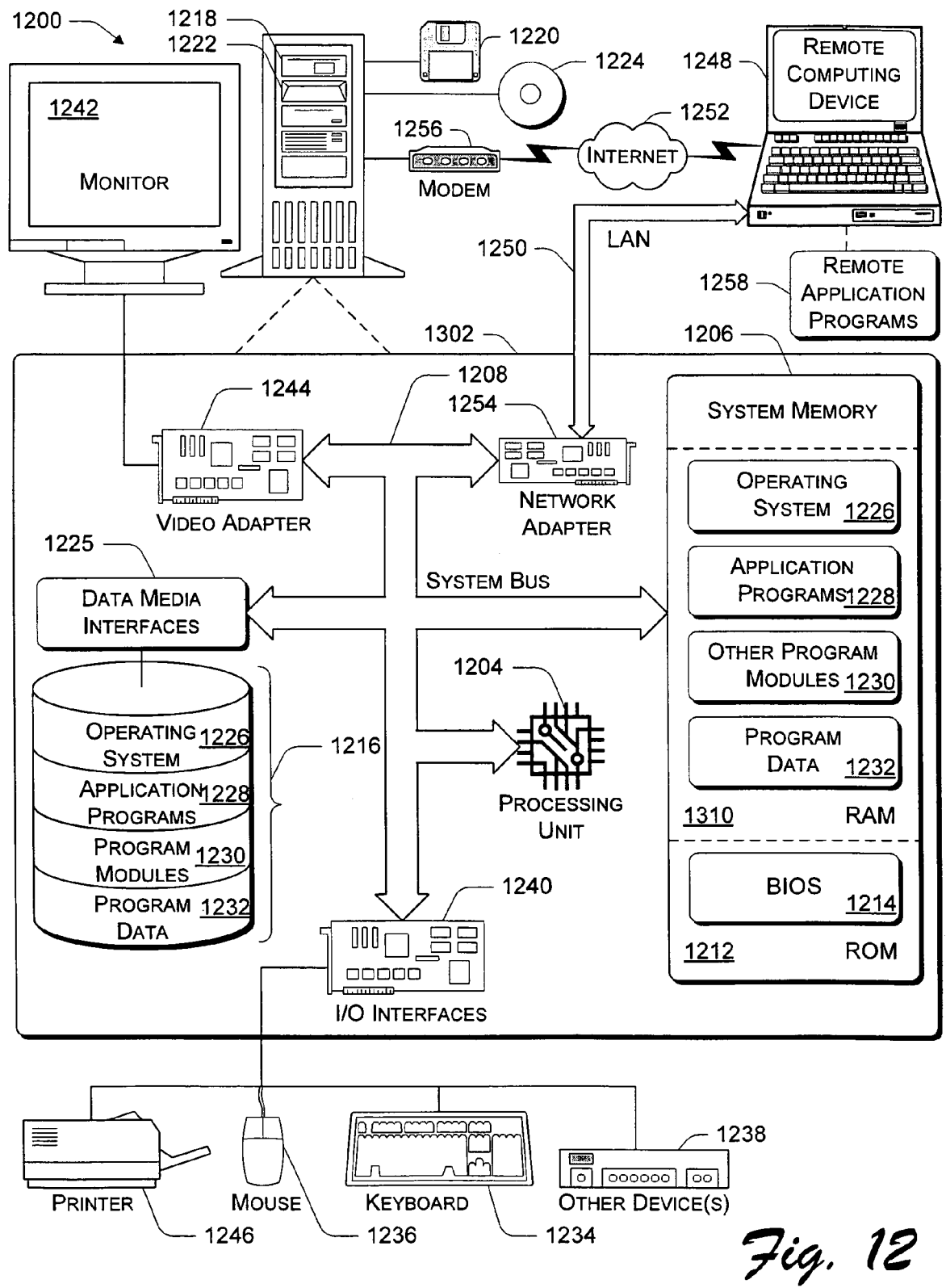
FIG. 12 is a diagram of an exemplary computing environment in which the implementations described herein may operate.

The various components and functionality described herein are implemented with a computing system. FIG. 12 shows components of typical example of such a computing system, i.e. a computer, referred by to reference numeral 1200. The components shown in FIG. 12 are only examples, and are not intended to suggest any limitation as to the scope of the functionality of the invention; the invention is not necessarily dependent on the features shown in FIG. 12.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 12, the components of computer 1200 may include, but are not limited to, a processing unit 1202, a system memory 1204, and a system bus 1206 that couples various system components including the system memory to the processing unit 1202. The system bus 1206 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 1200 typically includes a variety of computer-readable media. Computer-readable media can be any available media that can be accessed by computer 1200 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1200. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 1204 includes computer storage media in the form of volatile and/or nonvolatile memory such as read only memory (ROM) 1208 and random access memory (RAM) 1210. A basic input/output system 1212 (BIOS), containing the basic routines that help to transfer information between elements within computer 1200, such as during start-up, is typically stored in ROM 1208. RAM 1210 typically contains data and/or program modules that are immediately accessible to and/or presently being operated on by processing unit 1202. By way of example, and not limitation, FIG. 12 illustrates operating system 1214, application programs 1216, other program modules 1218, and program data 1220.

The computer 1200 may also include other removable/non-removable, volatile/nonvolatile computer storage media. By way of example only, FIG. 12 illustrates a hard disk drive 1222 that reads from or writes to non-removable, nonvolatile magnetic media, a magnetic disk drive 1224 that reads from or writes to a removable, nonvolatile magnetic disk 1226, and an optical disk drive 1228 that reads from or writes to a removable, nonvolatile optical disk 1230 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1222 is typically connected to the system bus 1206 through a non-removable memory interface such as data media interface 1232, and magnetic disk drive 1224 and optical disk drive 1228 are typically connected to the system bus 1206 by a removable memory interface such as interface 1234.

The drives and their associated computer storage media discussed above and illustrated in FIG. 12 provide storage of computer-readable instructions, data structures, program modules, and other data for computer 1200. In FIG. 12, for example, hard disk drive 1222 is illustrated as storing operating system 1215, application programs 1217, other program modules 1219, and program data 1221. Note that these components can either be the same as or different from operating system 1214, application programs 1216, other program modules 1218, and program data 1220. Operating system 1215, application programs 1217, other program modules 1219, and program data 1221 are given different numbers here to illustrate that, at a minimum, they are different copies. A user may enter commands and information into the computer 1200 through input devices such as a keyboard 1236 and pointing device 1238, commonly referred to as a mouse, trackball, or touch pad. Other input devices (not shown) may include a microphone, joystick, game pad, satellite dish, scanner, or the like. These and other input devices are often connected to the processing unit 1202 through an input/output (I/O) interface 1240 that is coupled to the system bus, but may be connected by other interface and bus structures, such as a parallel port, game port, or a universal serial bus (USB). A monitor 1242 or other type of display device is also connected to the system bus 1206 via an interface, such as a video adapter 1244. In addition to the monitor 1242, computers may also include other peripheral output devices 1246 (e.g., speakers) and one or more printers 1248, which may be connected through the I/O interface 1240.

The computer may operate in a networked environment using logical connections to one or more remote computers, such as a remote computing device 1250. The remote computing device 1250 may be a personal computer, a server, a router, a network PC, a peer device or other common network node, and typically includes many or all of the elements described above relative to computer 1200. The logical connections depicted in FIG. 12 include a local area network (LAN) 1252 and a wide area network (WAN) 1254. Although the WAN 1254 shown in FIG. 12 is the Internet, the WAN 1254 may also include other networks. Such networking environments are commonplace in offices, enterprise-wide computer networks, intranets, and the like.

When used in a LAN networking environment, the computer 1200 is connected to the LAN 1252 through a network interface or adapter 1256. When used in a WAN networking environment, the computer 1200 typically includes a modem 1258 or other means for establishing communications over the Internet 1254. The modem 1258, which may be internal or external, may be connected to the system bus 1206 via the I/O interface 1240, or other appropriate mechanism. In a networked environment, program modules depicted relative to the computer 1200, or portions thereof, may be stored in the remote computing device 1250. By way of example, and not limitation, FIG. 12 illustrates remote application programs 1260 as residing on remote computing device 1250. It will be appreciated that the network connections shown are exemplary and other means of establishing a communications link between the computers may be used.

CONCLUSION

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. A method, comprising:
receiving a request to add a new filter to a filter table stored in an inverse query engine cache;
adding the new filter to the filter table, wherein the new filter comprises a condition field, a data field, an expiration field, a filter weight field, and a permanent flag field, the permanent flag field being a Boolean field indicating that the new filter is not to be removed from the filter table during an expire cache operation or a trim cache operation;
assigning a weight value in the filter weight field to the new filter based on an estimate of a size of the new filter, wherein the weight value denotes the relative size of the new filter in relation to other filters stored in the filter table of the inverse query engine;
determining the filter table of a bounded size;
maintaining the inverse query engine cache at or below a maximum cache size, wherein the size of the inverse query engine cache may be indicated by size of the filter table, estimate of size of the filter table, or by cache usage;
wherein the inverse query engine cache comprises a control module, a cache, an add filter module, a remove filter module, a matcher, a maintainer, an expire module, a trim module, a cache weight module, a cache weight, an optimal weight, a maximum weight, a filter table, a most recently used list, and an expiration list;
wherein the expiration list comprises a filter identifier including an expiration value in the expiration field;
removing a filter based on an expiration time;
checking the expiration value in the expiration field of a filter against a current time, in response to the expiration value is earlier than the current time, remove the filter;
checking the specified period of time, removing a filter that has been stored in the filter table longer than a specified period of time;
trimming the filter table upon the occurrence of the filter table reaching the maximum weight, by determining the cache weight and identifying filters to be removed and removing filters from the filter table to obtain the optimal weight; and
wherein determining when a permanent flag in a filter is set, leave the filter in the filter table;
wherein the inverse query engine cache is used exclusively by an inverse query engine to store filters associated therewith.

2. The method as recited in claim 1, further comprising maintaining the size of the inverse query engine cache between an optimal cache size and the maximum cache size.

3. The method as recited in claim 1, wherein the maintaining further comprises:
determining if the addition of the new filter to the filter table increases the cache size above the maximum cache size; and
removing one or more filters from the filter table if the addition of the new filter causes the cache size to exceed the maximum cache size.

4. The method as recited in claim 1, wherein the maintaining further comprises:
identifying a weight associated with the new filter;

adding the weight associated with the new filter to a cache weight that is the sum of filter weights of filters in the filter table, each filter having a filter weight; and comparing the cache weight to the maximum cache size.

5. The method as recited in claim 1, further comprising identifying one or more expired filters in the filter table; and wherein the maintaining the inverse query engine cache further comprises removing at least one of the identified expired filters.

6. The method as recited in claim 1, further comprising a least recently used filter in the filter table; and wherein the maintaining the inverse query engine cache further comprises removing the least recently used filter from the filter table when a size of the inverse query engine cache reaches the maximum cache size.

* * * * *